United States Patent [19]

Pell et al.

[11] 4,047,816

[45] Sept. 13, 1977

[54] ATTITUDE DETERMINATION USING TWO TRANSMITTER/RECEIVER STATIONS AND SKEWED REFLECTORS

[75] Inventors: Kynric M. Pell, Laramie, Wyo.; David B. Brown, Huntsville, Ala.

[73] Assignee: The United States of America as represented by the Secretary of the Army, Washington, D.C.

[21] Appl. No.: 697,308

[22] Filed: June 18, 1976

[51] Int. Cl.² .................................................. G01B 11/26
[52] U.S. Cl. ..................................... 356/152; 356/141; 250/203 R
[58] Field of Search ............... 356/1, 4, 5, 141, 152; 250/203 R

[56] References Cited

U.S. PATENT DOCUMENTS

| | | | |
|---|---|---|---|
| 3,574,466 | 4/1971 | Peters et al. | 356/152 |
| 3,664,748 | 5/1972 | Bezu | 356/152 |
| 3,690,767 | 9/1972 | Missio et al. | 356/141 |
| 3,717,413 | 2/1973 | Kubo et al. | 356/152 |
| 3,799,676 | 3/1974 | Chatterton | 356/152 |
| 3,893,772 | 7/1975 | Tilly et al. | 356/152 |

OTHER PUBLICATIONS

T. W. Barnard et al., Applied Optics, 4-1966, vol. 5, No. 4, pp. 497-504.

Primary Examiner—S. C. Buczinski
Attorney, Agent, or Firm—Nathan Edelberg; Robert P. Gibson; Freddie M. Bush

[57] ABSTRACT

A system is provided for remote determination of the attitude of a vehicle. The system utilizes two remotely located transmitting-receiving stations and two retroreflecting single plane roof prisms mounted on a vehicle which may exhibit high angular rates about a roll axis relative to the angular rates about two other orthogonal axes. The two remotely located transmitter-receiver stations provide tracking of the vehicle, continuously illuminating the vehicle with a light source located at each station so that the position of the object relative to the remote stations is obtained.

6 Claims, 4 Drawing Figures

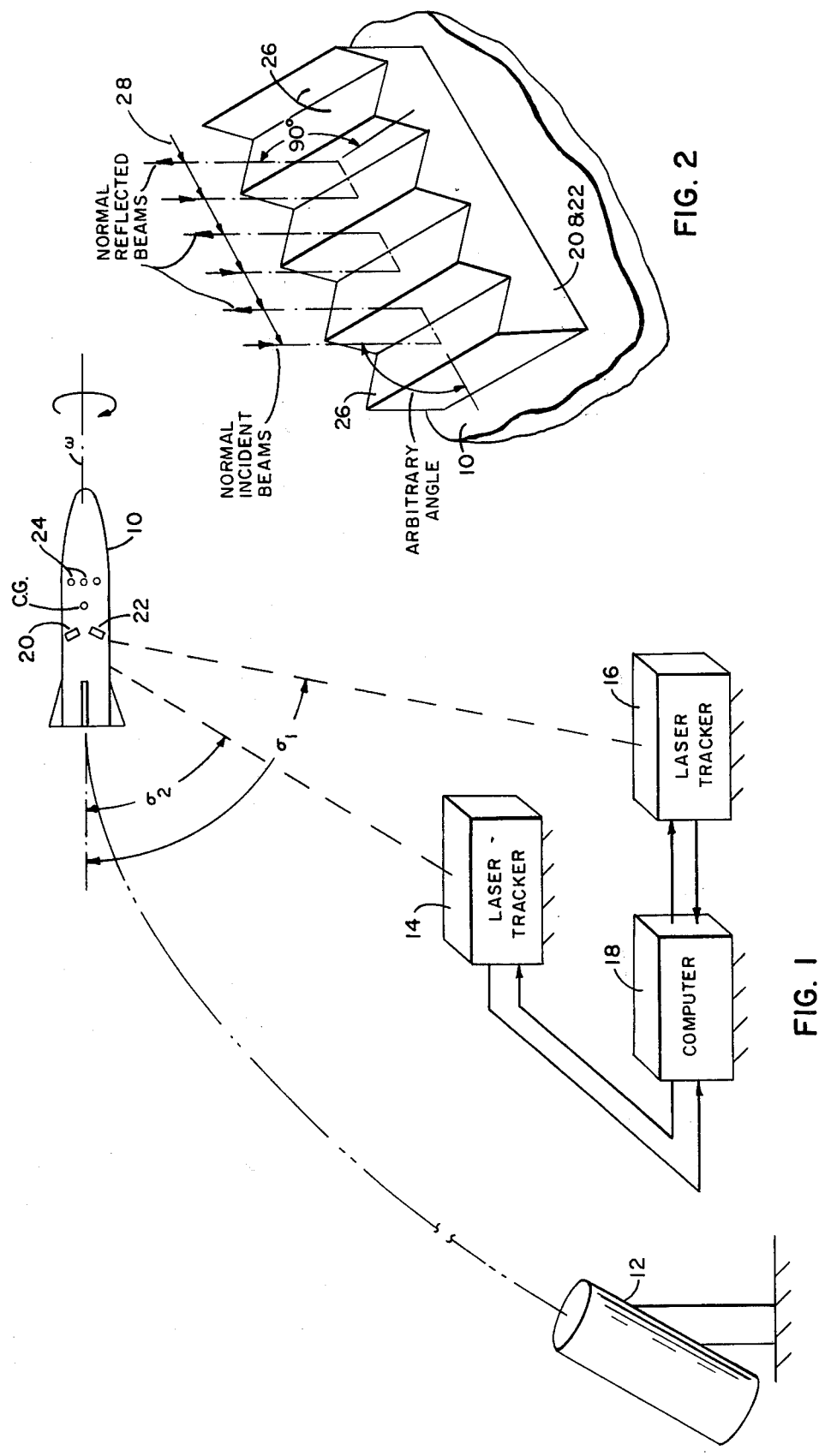

ATTITUDE DETERMINATION USING TWO TRANSMITTER/RECEIVER STATIONS AND SKEWED REFLECTORS

DEDICATORY CLAUSE

The invention described herein may be manufactured, used, and licensed by or for the Government for governmental purposes without the payment to us of any royalties thereon.

BACKGROUND OF THE INVENTION

The measurement of flight vehicle dynamics such as pitch, yaw, and roll can be obtained using both onboard and earth-based instrumentation. Onboard systems, such as gyroscopic platforms and accelerometers require related transmission systems to communicate to earth-based stations or on-board recorders. These onboard systems are expensive and are usually destroyed with the vehicle after one flight. Ground based measurement systems employ photographic tracking methods or several tracking stations for triangulation measurements.

Laser radars are established in prior art teachings for determining a flight vehicle position or range with automatic laser trackers, related receivers, and retroreflectors. In "Radar Handbook" by M.I. Skolnik, McGraw-Hill Book Company, 1970, Chapter 37 discloses laser radars in detail. For example, page 37-62 shows laser tracking interconnected with a computer and tracking mount. In describing motion of a flight vehicle the variables that are involved are related to vehicle position, roll rate, and attitude rates. Prior techniques of measuring these variables have used radar or laser radar and triangulation with three or more ground stations or high speed camera trackers and triangulation from three or more camera stations. When less than three reference stations are used only position information is determined.

SUMMARY OF THE INVENTION

Attitude of a flight vehicle is obtained using two laser transmitter/receiver station tracking of skewed reflectors on the vehicle. A single laser transmitter/receiver station will track skewed retroreflectors on the vehicle to determine position, roll rate, and attitude in one plane, this plane being defined by the vehicle roll axis and the ground station. As the vehicle rotates each plane of retroreflected energy sweeps the ground stations at a delta time interval dependent upon the attitude of the vehicle. The reflector alignment on the surface of the vehicle is known and the roll rate is measured by a signal reflected from one of the skewed retroreflectors on the vehicle. These reflected laser pulses are detected and processed to resolve the position, roll, and attitude (pitch and yaw) data. The skewed reflector method of measurement allows the attitude of a flight vehicle to be determined from only two tracking stations.

BRIEF DESCRIPTION OF THE DRAWINGS

FIG. 1 is a diagrammatic illustration of a system for carrying out the method of vehicle attitude determination. FIG. 2 is a view of a typical roof type prism array.

DESCRIPTION OF THE PREFERRED EMBODIMENT

Figure 4:
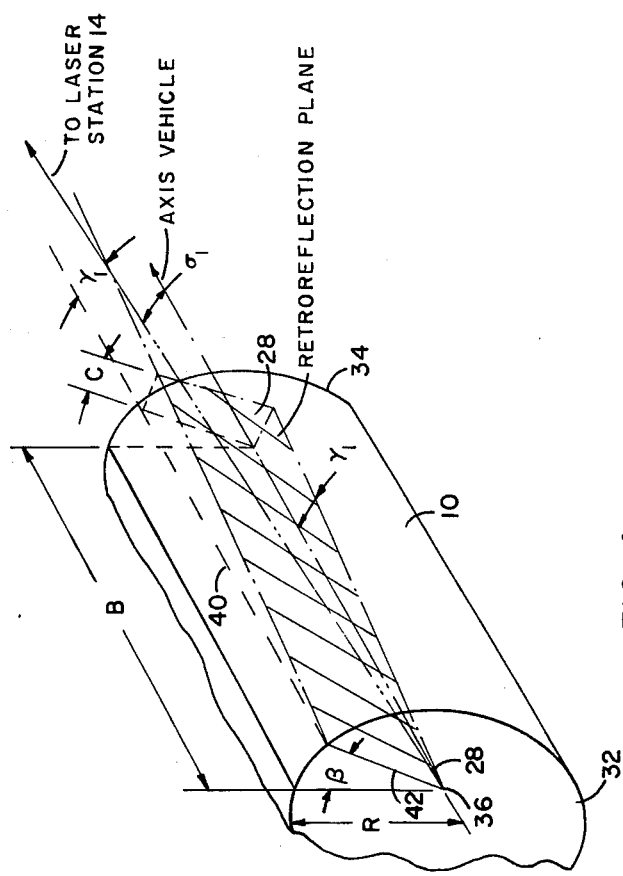
FIGS. 3 and 4 are geometry schematics for determining the laser aspect angle to the reflectors.

Referring now to the drawings wherein like numerals represent like parts, FIG. 1 discloses a block diagram of a system utilizing the tracking method employing skewed reflectors. In the system of FIG. 1, a flight vehicle 10 is launched from a launch site 12 along a general trajectory toward a target area. Laser trackers 14 and 16 are located off range for tracking the vehicle. The laser trackers comprise laser transmitter/receivers for directing coherent optical energy toward the vehicle and detecting coherent optical energy reflected from the vehicle. A pair of single plane retroreflectors 20 and 22 are located at skewed angles to each other on the surface of flight vehicle 10 to reflect the incident laser energy back to the respective transmitting stations. The laser tracker and retroreflector system permit near real time determination of the missile performance. This increase in analysis speed is accomplished by the laser tracker recording the analog input signals and/or coupling these signals to a digital computer 18. Intelligence signals coupled to the computer are processed through a converter (not shown) of the computer which provides a digital signal of the time of occurrence of return pulses in a computer compatible format. if desirable, this data may instead by recorded on digital magnetic tape recorders. Each laser tracker (transmitter-receiver station) has a continuous wave (CW) laser and a pulsed laser operated at different frequencies or power levels. Disposed on the surface of the flight vehicle is a retroreflecting array of corner cube reflectors 24 or reflective material for reflecting a portion of the collimated incident beam from the respective pulse laser transmitter back to the respective fixed laser trackers. Array 24 forms a retroreflecting band axially around the perimeter of the vehicle for providing this routine laser tracking of the vehicle with the pulse lasers.

Retroreflectors 20 and 22 are each a series of roof type prisms arranged in parallel as shown in more detail in FIG. 2. Arrays 20 and 22 are disposed at selected positions on the vehicle surface for reflecting collimated laser light back to its source. Each reflector array functions as a single plane corner reflector so that collimated light incident on the surface 26 of the array from a direction parallel to the retroreflection plane is retroreflected in the same plane. The retroreflection plane 28 of each roof type prism array can be defined as the plane which includes all centered normals to all of the reflecting surfaces of the array. These arrays are disposed on the vehicle surface so that the retroreflective planes are skewed relative to each other and one or both planes may be skewed with respect to the vehicle roll axis $\omega$.

Figure 3:
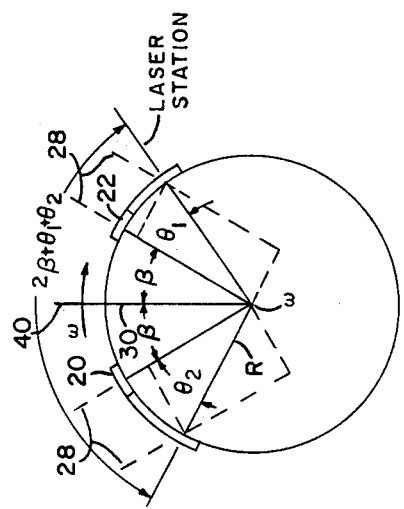

As shown geometrically in FIG. 3 the retroreflectors 20 and 22 are mounted on the surface of the vehicle a distance R from the vehicle axis of rotation $\omega$. The reflectors are each located at a polar angle $\beta$ from an established reference line 30 projecting from the vehicle axis. Each reflector is skewed at an angle relative to the roll axis so that the retroreflection plane 28 is oblique in the end view shown.

As the vehicle rolls in flight light is retroreflected from one retroreflector to one ground station and after the vehicle rolls an angle $2\beta + \theta_1 + \theta_2$ the incident beam from the station is again retroreflected to the same station.

FIG. 4 discloses additional geometry in determining the laser aspect angles. The region or segment of the vehicle between circles 32 and 34 is representative of a segment of the vehicle which contains reflectors 20 and 22 on the surface thereof, with the dimension B being defined by the axial station on the vehicle surface penetrated by a line joining the intersection of the roll axis ($\omega$) and line 30 (point 36) with the laser ground station. The reflective plane 28 normal to the surface of a reflector, is shown projected into the vehicle to the point of intersection 36 with the vehicle axis $\omega$. A plane 40 projects from the vehicle surface and includes the vehicle roll axis $\omega$ and has a common intersecting line 42 with plane 28. In relating the vehicle roll axis to the reflector normal plane 28, it is convenient to describe a geometric, right angle wedge defined between the planes 40 and 28. The wedge, of course, has a common edge 42 at one end of the reflector and is separated at the other end of the reflected by a distance C. Thus, C is the perpendicular distance between the plane normal to the reflector and the plane parallel with and through the axis at an axial distance B from point 36.

Thus, as shown in FIGS. 3 and 4, the angle $\gamma_1$ is the inclination of retroreflector 22 with respect to the roll axis. A similar inclination angle $\gamma_2$ can be associated with reflector 20 to skew it with respect to reflector 22 and the roll axis. The aspect angle $\sigma$ is the angle between the vehicle axis $\omega$ and the line joining point 36 and the laser station. Trigonometric relationships which exist for both reflectors are:

$$\tan \gamma_1 = \frac{C_1}{B}, \qquad \tan \gamma_2 = \frac{C_2}{B},$$

$$\tan \theta_1 = \frac{C_1}{R}, \qquad \tan \theta_2 = \frac{C_2}{B},$$

$$\tan \sigma_1 = \frac{R}{B}, \qquad \tan \sigma_2 = \frac{R}{B},$$

$$\alpha = \theta_1 + \theta_2, \text{ and} \qquad \sin \theta_1 = \frac{\tan \gamma_1}{\tan \sigma_1}.$$

The angle $\sigma$ is the same for both retroreflectors relative to the same ground station. Typically, as the vehicle rotates around its roll axis, light is retroreflected to one station from one single plane prism retroreflector and after a time interval $\Delta t$, a pulse is retroreflected to the same station from the second single plane prism. The instantaneous angle between the vehicle roll axis $\omega$ and the line joining the vehicle reflectors 20 or 22 along the beam axis to the tracking stations 16 and 14 is respectively $\sigma_1$ and $\sigma_2$, shown in FIG. 1.

The angle $\sigma_1$ between roll axis $\omega$ and the line joining either of the vehicle reflectors 20 and 22 to the tracker 16 can be obtained from the equation $$\tan \sigma_1 = \tan \gamma_1 (1 - A^2 - 2A \cos \alpha)^{1/2}/\sin \alpha, \qquad (1)$$

where
$A = \tan \gamma_2 / \tan \gamma_1$,
$\alpha = 2\pi\omega\Delta t - 2\beta$,
and
$2\beta$ = the polar angle between the planes of prisms 20 and 22.

The angles $\gamma_1$, $\gamma_2$ and $\beta$ are known from preflight measurements on the vehicle. $\Delta t$ and $\omega$ are determined from the retroreflected attitude data from the laser tracker. The time interval between alternate pulses received at each tracking station from a retroreflector is directly related to the vehicle roll rate. Further a roll position at any time can be inferred.

For a system composed of two transmitter-receiver stations the time interval measurements at the second station provide for the determination of a second aspect angle $\sigma_2$. Knowing $\sigma_1$ and $\sigma_2$ the attitude of $\omega$ can be resolved into any desirable coordinate system. The computer converts the flow of data into selected vehicle performance parameters.

During operation, as vehicle 10 is launched into or flies into the tracking range of tracking stations 14 and 16, it is tracked by the pulsed laser of each station to provide the positional data necessary to disclose vehicle position as a function of time. Range determination is obtained through the pulse laser tracking from each laser tracker by way of the corner cube reflector band 24 or alternatively by triangulation procedures as established in the prior art. As the vehicle rotates a CW laser pulse is returned to each tracking station when the respective stations is swept by the retroreflection plane of each prism array. The time interval between pulses returned to the two stations from both arrays provide the data for determining vehicle attitudes.

At a given time $t$ the vehicle attitude may be considered to be where the retroreflection plane of reflector 22 is aligned with tracker 16 allowing a return pulse of CW laser energy to occur. After a time period of $\Delta t$ the vehicle roll attitude has changed sufficiently to allow a pulse from reflector 22 to be detected by tracker 14. As the vehicle roll, pitch, and yaw continue to change, return pulses are received from skewed reflector 20 at trackers 16 and 14. Since the reflectors are skewed the angles are different at which the respective reflectors are aligned with a detector, resulting in a time difference between reception of returned pulse from the differently positioned reflectors at a given ground station. The time intervals between pulses are functions of the vehicle pitch and yaw or attitude allowing the performance parameters to be obtained.

The information obtained by measuring the time interval between pulse reception at the two ground stations for light retroreflected from the same retroreflector offers an alternate approach to data reduction which may be desirable for some flight vehicles. In order to derive a simplified mathematical representation it is convenient to define two coordinate systems.

A ground-fixed right handed cartesian coordinate system is defined with the origin located at the vehicle launch site, the $+X$ axis representing crossrange direction, the $+Y$ axis representing downrange direction and the $+Z$ axis representing vertically upward. A vehicle oriented coordinate system may be established with origin at the vehicle center of gravity (CG), the positive $\omega$-axis coinciding with the vehicle roll axis pointing toward the nose; a positive $\eta$-axis lying perpendicular to the $\omega$ axis and parallel to the $x$-$y$ plane of the ground-fixed system; and a positive $\epsilon$ axis being perpendicular to $\eta$ and $\omega$. These two right-hand, orthogonal coordinate systems allow the vehicle position to be readily expressed with respect to the ground-fixed system. The pitch of the projectile is defined as the angle between the $\omega$ axis and the $x$-$y$ plane and yaw can be defined as the angle between the $y$-$z$ plane and the projection of the $\omega$ axis into the $x$-$y$ plane. The time interval for reception between pulses reflected from the two single plane reflectors to laser tracker 14 will be sensed by the detector at that station. Similarly the time interval between pulses returned from the first array to the two laser ground stations is determined by obtaining the difference in the times of detection by the respective stations.

In the particular case where one of the retroreflectors is parellel to the roll axis, that is $\gamma$ is equal to zero for this reflector the time interval between pulse reception at two different stations is given by $$\Delta t = \frac{1}{\omega}\left( \arctan\left(\frac{\xi_1}{\eta_1}\right) - \arctan\left(\frac{\xi_2}{\eta_2}\right) \right) \quad (2)$$

where $\epsilon_i$ and $\eta_i$ are coordinates of the $i$ th ground station in the vehicle oriented system. These coordinates can be expressed in terms of the known (surveyed $x, y, z$ position of the ground stations, the missile position, and the pitch and yaw angles previously defined. Therefore data reduction can be based on simultaneous solution of two equations of the form of equation (1) or alternately one of the form of (1) and one of the form of (2).

Obviously, the time intervals between pulses returned to the tracker detector are influenced by changes in vehicle position, attitude, and roll rate occurring between the various pulse receptions. By assuming the vehicle dynamics to be constant or unchanging during each data increment, instantaneous values with rather small errors can be established for vehicles with rates typical of most flight vehicles. If the vehicle position and the various pulse reception times are recorded rather than reduced in real time errors due to vehicle dynamics can be almost eliminated by using the data to determine the various rates. Near real time data reduction can be done by smoothing data from several pulse receptions at each of the tracking stations.

Thus, with the tracking station having known coordinates and the skewed reflectors having established coordinates on the surface of the vehicle, retroreflected pulse reception time at the ground stations allow vehicle position, attitude and roll rate to be obtained in rear real time for each pulse reception.

Although a particular embodiment and form of the invention has been described, it will be obvious to those skilled in the art that modifications may be made without departing from the scope and spirit of the invention. For example, reflectors 20 and 22 may be inclined to the vehicle surface to face the surfaces more toward the aft or the fore end of the vehicle to enhance the duration of tracking by a particular pair of stations. Similarly, additional pairs of tracking by a particular pair of stations. Similarly, additional pairs of tracking stations may be prepositioned downrange of the vehicle trajectory for picking up the vehicle when it comes within range. Accordingly, it is understood that the invention is limited only by the claims appended hereto.

We claim:

1. In a tracking system for determining the spatial attitude of an object having a longitudinal axis of rotation and wherein optical energy is directed from a tracking station toward the object and reflected back to the tracking station from the object, the improvement of first and second optical reflectors disposed on the surface of said object, said reflectors being disposed respectively along first and second axes skewed to each other for retroreflecting impinging optical energy within the respective planes formed by the normal to the surface of the object at each reflector and said first and second reflector axes respectively.

2. A trackling system as set forth in claim 1 wherein each of said reflectors is an array of roof prisms for providing single plane corner reflection.

3. A tracking system as set forth in claim 2 wherein said prisms are located on the surface of said object, equidistant from the longitudinal axis of the object and are separated by a known polar angle, said polar angle being defined as twice the angle between a reference line projecting from the object longitudinal axis to the surface of the object and a second line from the intersection of said reference line and said object longitudinal axis to said first reflector axis, said reference line and said second line defining a plane which intersects the object longitudinal axis, and the reflectors.

4. A tracking system as set forth in claim 3 wherein said object is an airborne vehicle and said reflector arrays are disposed in respective planes skewed with respect to each other and the vehicle roll axis.

5. In a tracking systen having a transmitter-receiver disposed for tracking a moving vehicle, a method of tracking said vehicle comprising the steps of:

launching a vehicle ito a general flight trajectory;

directing a beam of optical energy from first and second separately established group stations toward said vehicle;

retroreflecting impinging energy of said optical energy from first and second retroreflector arrays on the surface of said vehicle back toward said ground stations;

receiving said retroreflected energy by said tracking stations for processing to provide vehicle attitude.

6. A method of tracking a moving vehicle as set forth in claim 5 and further comprising the steps of rotating said vehicle around a longitudinal roll axis during said tracking for periodically rotating said first and second retroreflector arrays into a plane between said tracking stations and said vehicle for providing pitch, yaw, and roll attitude data; and positioning said first and second reflectors on the surface of said vehicle prior to launch for establishing a polar angle of separation between the reflectors and the vehicle longitudinal axis for skewing the reflectors with respect to each other and establishing the reflectors respective positions relative to the vehicle longitudinal axis.

* * * * *

UNITED STATES PATENT AND TRADEMARK OFFICE
CERTIFICATE OF CORRECTION

PATENT NO. : 4,047,816
DATED : September 13, 1977
INVENTOR(S) : Kynric M. Pell and David B. Brown It is certified that error appears in the above-identified patent and that said Letters Patent are hereby corrected as shown below:

Column 3, line 19, change "reflected" to read --reflector--; and line 56, change "$(1 = A^2 = 2A \cos \alpha)$" to read --$(1 + A^2 + 2A \cos \alpha)$--.

Column 4, line 23, change "attitudes" to read --attitude--; and line 57, change "$\varepsilon$" to read --$\xi$--.

Column 5, line 14, change "$\varepsilon_i$" to read --$\xi_i$--; and line 40, change "rear" to read --near--.

Column 6, line 33, change "ito" to read --into--.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*